(12) United States Patent
Hedges et al.

(10) Patent No.: US 6,501,543 B2
(45) Date of Patent: Dec. 31, 2002

(54) APPARATUS AND METHOD FOR DETERMINING POSITION

(75) Inventors: Tom M. Hedges, Great Falls, VA (US);
Sean Beliveau, Leesburg, VA (US);
Timothy Pratt, Leesburg, VA (US);
Rick Slater, Reston, VA (US); Michael J. Sobel, Annandale, VA (US)

(73) Assignee: Arc Second, Inc., Dulles, VA (US)

( * ) Notice: Subject to any disclaimer, the term of this patent is extended or adjusted under 35 U.S.C. 154(b) by 0 days.

(21) Appl. No.: 09/791,735

(22) Filed: Feb. 26, 2001

(65) Prior Publication Data

US 2002/0033940 A1 Mar. 21, 2002

Related U.S. Application Data

(60) Provisional application No. 60/185,379, filed on Feb. 28, 2000.

(51) Int. Cl.[7] .............................................. G01B 11/26
(52) U.S. Cl. ................................. 356/141.4; 356/141.5
(58) Field of Search ........................... 356/141.4, 141.5

(56) References Cited

U.S. PATENT DOCUMENTS

| | | | |
|---|---|---|---|
| 4,441,809 A | * | 4/1984 | Dudley et al. |
| 4,820,041 A | * | 4/1989 | Davidson et al. |
| 5,100,229 A | * | 3/1992 | Lundberg et al. |
| 5,110,202 A | * | 5/1992 | Dornbusch et al. |
| 5,294,970 A | * | 3/1994 | Dornbusch et al. |

* cited by examiner

*Primary Examiner*—Stephen C. Buczinski
(74) *Attorney, Agent, or Firm*—Rader, Fishman & Grauer PLLC

(57) ABSTRACT

An improved receiver for use in a robotic theodolite spatial positioning apparatus that allows a single user to determine elevation and azimuth angle data. To determine elevation angle of the receiver, the receiver has a sensor that receives a first position signal and a second position signal emitted from an optical transmitter. The receiver outputs a first and a second receive signal. A calculator in the receiver determines the first interval time separation between the first and second receive signals, converts the first time interval separation into elevation angle data and outputs the elevation angle data. A display in the receiver receives and displays the elevation angle data. The receiver is selectively positionable within a workspace. Determination of azimuth angle of the receiver is made by receiving a strobe pulse, determining the periodicity of the pulse and comparing the periodicity with transmitter calibration information stored in the receiver, and converting the measure of time separation into azimuth angle data. The display in the receiver receives and displays the azimuth angle data. Additionally, the user can select desired azimuth and/or elevation angles, and the display can guide the user to the desired location.

27 Claims, 17 Drawing Sheets

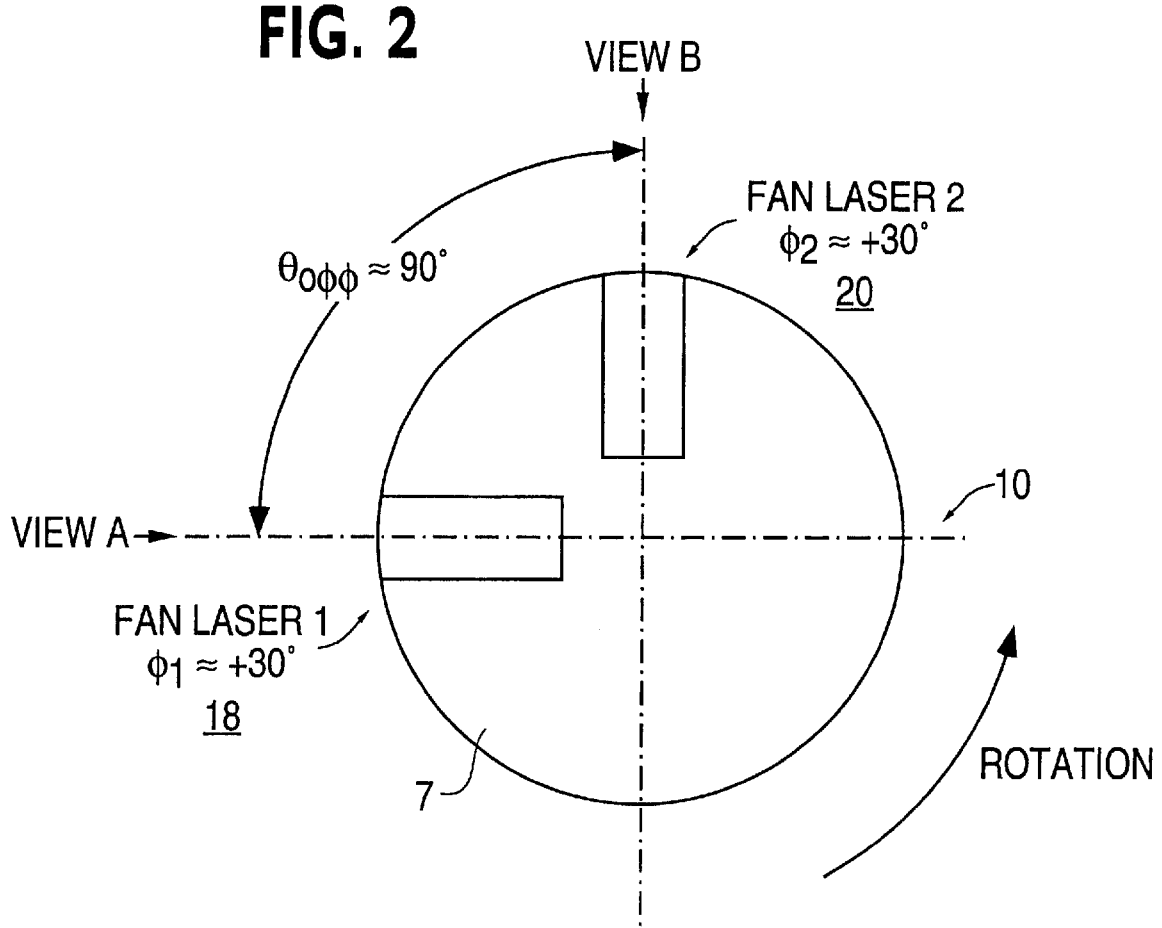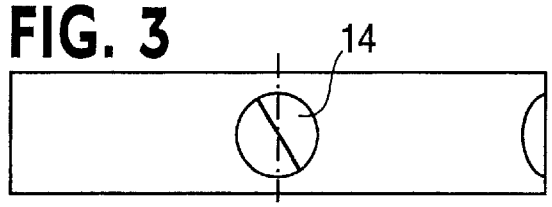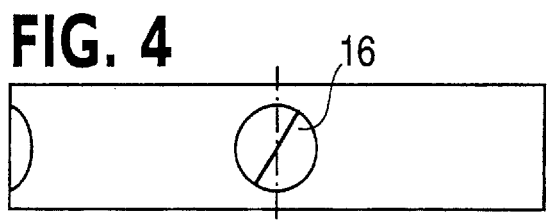

$\theta = \theta_2 - \theta_1 - \theta_{offset}$

WANT TO DETERMINE θ ANGLE HERE

APPARATUS AND METHOD FOR DETERMINING POSITION

CROSS-REFERENCE TO RELATED APPLICATIONS

This application claims priority of previously filed U.S. Provisional Application Ser. No. 60/185,379 filed Feb. 28, 2000, incorporated herein by reference. This application is also related to U.S. patent application Ser. Nos. 09/532,100, 09/532,099, and 09/523,026 filed Mar. 21, 2000, and U.S. patent application Ser. No. 09/417,112, all of which relate to Precision Position Measurement Systems and Methods, and all of which are incorporated herein by reference.

BACKGROUND OF THE INVENTION

1. Field of the Invention

This invention relates generally to an apparatus and method for determining position information. More particularly, this invention relates to a receiver unit that receives direction and timing information and, using the received information, can be used to determine azimuth and elevation of an object or point within an area.

2. Description of the Related Art

Precise position measurement data is necessary or useful in a variety of technical fields. Obvious examples include navigation for airplanes and ships which in light of recent technical advances often include navigational aides utilizing global positioning system (GPS) data that may be overlaid on maps to facilitate navigation. The precision of GPS, however, is limited to within a few meters due to the granularity of the satellite sensors and the errors that build up over the long distances. Three dimensional position information and data is likewise useful in many other industrial arts including robotic control, virtual reality, augmented reality and particularly the building and construction trades.

Three-dimensional positional information gathering apparatus and systems are often costly to deploy in construction type environments and often require highly skilled operators to install and operate the equipment. For example, multiple transmitters might require multiple line of sights and other setup criteria that can only be obtained using large and expensive equipment which is often not well adapted to field use. One example is a low cost precision three-dimensional system described in the U.S. patent applications identified above. These user friendly precision three-dimensional measurement systems employ at least two optical transmitters, one or more selectively positional optical receivers and sophisticated algorithms for calculating three-dimensional data within the predetermined work area.

As will be well recognized by those skilled in the construction and building trades, many commercially significant tasks require precise position measurement information or data. For example, in land surveying it is known to measure the height, distance and angular position with respect to a known reference point using three separate instruments.

Three-dimensional data is generally not required for most building and construction uses. For example, leveling a floor in the building trade requires only a horizontal plane which is only-one value of elevation (elevation equal to zero). Turning an angle from a corner location to mark the position of a wall requires a vertical plane rotating about an axis, only one dimension in this case azimuth. Laying out a dual slope requires azimuth and elevation data, totaling two dimensions. Similarly, a myriad of other such applications in the building and construction trades can be performed with combinations of elevation and azimuth data relating to a particular task. Thus a precise position measurement system that provides two-dimensional data would have many practical commercial building and construction applications. However, as with the three-dimensional position measurement systems, two-dimensional position measurement systems in the past have not been adapted for efficient field use. Additionally, prior art two-dimensional measurement systems generally required two or more operators and were difficult to set up and maintain for field operation.

U.S. Pat. No. 4,441,809 to Dudley et al. teaches the taking of all three surveying measurements, the height, the distance, and the angular position, by a single operator using a two-part instrument: a beam transmitter and a receiver. The receiver unit requires two sensors spaced a known distance apart in a direction parallel to the axis of rotation of a transmitted beam. In this manner, when a V-beam is transmitted about a vertical axis to define a horizontal reference plane, the sensors are vertically spaced. The distance between the leading and trailing edges of the beam is greater at the upper sensor than at the lower sensor. If a measure of these distances is made, the distance of either sensor from the horizontal reference plane and their distance from the axis of rotation can be calculated. However, the transmitter sends a corresponding RF signal carrying a digital signal containing the rotational information related to the angular position of the beam. This RF signal is received by the receiver and supplied to a circuit that contains pulse counters. Light sensors provide start and stop times as the laser beam sweeps for use by the counters. An opaque mask having apertures matching the beam inclination and orientation is placed in front of the light sensor. This allows only predetermined beam portions corresponding to sharp pulses to be detected and sent to the pulse counters. In this manner, Dudley '809 requires 1. that the receiver must be level in order for the beams to proceed through the mask apertures, 2. at least two sensors spaced apart in the vertical plane, 3. encoders for counting the received signals, and 4. a separate RF signal receiver for receiving RF pulse signals from the transmitter.

Thus there is a need for a low cost spatial positioning system capable of generating precise two-dimensional information and which is well adapted to efficient field setup and use, including not requiring two spaced apart sensors, does not require a separate RF receiver for receiving RF pulse signals from the transmitter, and does not require an opaque mask.

It is an object of the present invention to provide a low cost two-dimensional position measurement apparatus and process which is both easy to set up in the field and capable of single operator utilization.

It is another object of the present invention to provide a two-dimensional measurement apparatus and process which is precise, rugged, reliable and easy to set up and used by a single operator under construction site conditions.

It is another object of the present invention to provide a receiver having a single optical sensor for use in a robotic theodolite system.

It is another object if the present invention to provide a receiver having a single optical sensor that can compute at least one of azimuth and elevation relative to a transmitted optical signal.

It is a further object of the present invention to provide an improved low cost robotic theodolite system and procedure for conveniently generating azimuth and elevation angle data based upon detected timing differences between illuminating laser beam strikes and a reference strobe and based upon convenient calibration data for the utilized optical transmitter.

SUMMARY OF THE INVENTION

Novel features of applicants' invention are directed to overcoming the above described deficiency in prior art precision position measurement systems by providing a novel receiver apparatus and processes for: (i) calculating elevation angles based upon laser fan beam strikes or hits from a single rotatably mounted transmitter that emits two constant laser beams from a rotating head, where selected parameters of the rotating fan beams have been determined during a calibration procedure associated with the manufacture of said transmitter, and a receiver which uses a single light responsive element, (ii) further calculating azimuth angles using a single periodic reference pulse from a series of light emitting diodes, (LEDs) the reference pulse preferably generated once per revolution of the transmitter rotating head and the reference pulse being received by the same single light responsive element. In another embodiment of the present invention the improved system and process can be adapted to make distance calculations by using two receivers, which are positioned in the measurement field at a known distance separation, and which receive only the two rotating laser beams and the reference pulse.

In the apparatus and method of the present invention, following setup of the transmitter, a single user transports the receiver to a desired location, points the receiver in the general location of the transmitter, and from a user readable display on the receiver is informed of the desired parameters of the location. The desired parameters can be one of many parameters derived from the receiving of the transmitted optical beams, including azimuth, elevation, and distance from the transmitter.

User interaction with the receiver is another important feature of the apparatus. For example, a display screen on the receiver can indicate to the user a direction to move the receiver in order to arrive at a predetermined location. Alternatively, the user can input into the receiver the desired location, and the receiver, upon receiving the transmitted beams, indicates to the user which direction to move the receiver within up to six degrees of freedom, that is, up, down, left, right, forwards and backwards in order to approach and arrive at the desired location.

In the preferred embodiment of the receiver, a single broadband wide-angle detector is used to detect the two transmitted optical beams and the periodically transmitted strobe.

These and other features and advantages of this invention are described in or are apparent from the following detailed description of the preferred embodiments.

BRIEF DESCRIPTION OF THE DRAWINGS

The preferred embodiments of the present invention will be described in detail, with reference to the following figures, wherein:

FIG. 3 is a edge view of the output of the first fan laser;

FIG. 4 is an edge view of the output of the second fan laser;

Throughout the drawing figures, like reference numerals will be understood to refer to like parts and components.

DESCRIPTION OF THE PREFERRED EMBODIMENT

In general, the present invention relates to novel receiver apparatus and processes for: (i) calculating elevation angles based upon laser fan beam strikes or hits from a single rotatably mounted transmitter that emits two constant laser beams from a rotating head, where selected parameters of the rotating fan beams have been determined during a calibration procedure associated with the manufacture of said transmitter, and a receiver which uses a single light responsive element, (ii) further calculating azimuth angles using a single periodic reference pulse from a series of light emitting diodes, (LEDs) the reference pulse preferably generated once per revolution of the transmitter rotating head and the reference pulse being received by the same single light responsive element.

Figure 1:
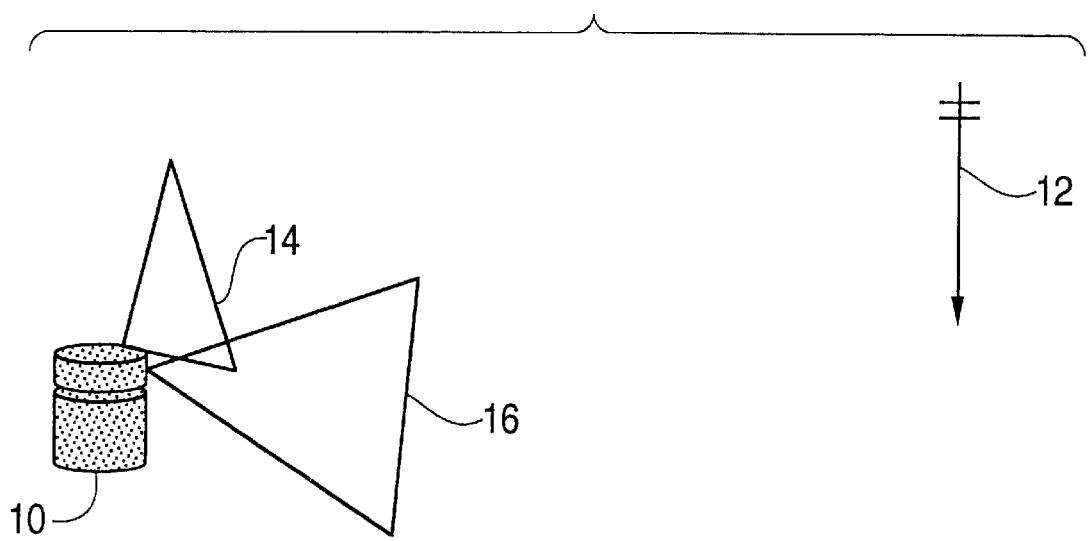
FIG. 1 is a schematic illustration of an optical transmitter and receiver in accordance with the preferred embodiment of the present invention.

FIG. 1 is a schematic illustration of an optical transmitter 10 and receiver 12 in accordance with the preferred embodiment of the present invention. Transmitter 10 emits two rotating fan beams 14 and 16. In the preferred embodiment, the fan beams 14, 16 are laser fan beams, and more preferably the laser fan beams 14, 16 are unmodulated.

FIG. 2 depicts the preferred layout of the transmitter head 10. As indicated in the drawing and will be discussed in further detail hereinafter, there are three important angles to describe the fan beams 14 and 16 as the optical transmitter 10 rotates about its central axis. The three angles are denominated $\Phi_1$, $\Phi_2$ and $\Theta_{off}$, and describes the angular separation between the two fan lasers 18, 20 in the rotating head 10 as viewed from the top. The fan lasers 18, 20 are normally spaced 90 degrees apart, and $\Phi_1$ and $\Phi_2$ describe the tilt of the fan plane of the two fan lasers 18, 20, respectively. The two tilt angles are measured from vertical and are normally offset 30 degrees. FIGS. 3 and 4 depict an edge view of the output of the first fan laser 18 and the second fan laser 20, respectively. As hereinafter will be further explained the values for these three important angles which characterize each optical transmitter uniquely are determined through a factory calibration process.

As the transmitter head 10 rotates, it scans the measurement field in a manner to be more fully described hereinafter with the two planes of laser fan beams 14 and 16. In addition to this scanning operation, optical transmitter 10 fires an optical strobe, not shown or a reference pulse at a fixed point in the transmitter head revolution. Preferably, the optical strobe is infrared and unmodulated. To ensure accurate position data, the azimuth reference must be very stable. There are several ways to create this transmitter shaft position index and one of the simplest and preferred techniques is to use the index normally supplied with a commercially available optical encoder. In addition there are several methods known to those skilled in the art for communicating the azimuth reference of optical transmitter 10 to a receiver/detector 12. In the preferred embodiment an optical strobe pulses, bursts, or flashes based upon a once-per-revolution azimuth reference coupled to the transmitter motor shaft, not shown. In this manner the strobe and the pair of laser fan beams 14, 16 illuminate a receiver/detector 12 selectively placed in the measurement field, the strobe providing a zero reference for the rotation of the optical transmitter 10. This series of scanning strobe pulses and laser fan beams 14, 16 provides the basis for the measurement calculations to be made by the receiver 12, and will be described in more detail hereinafter.

In order to achieve high precision measurements, applicants' preferred embodiment utilizes a manufacturing process complemented with a calibration procedure to uniquely characterize or classify the laser fan beams of each optical transmitter 10 with calibration data. This process is fully disclosed in Hedges et al. U.S. application Ser. No. 09/532, 100 which is hereinabove referenced.

Figure 5:
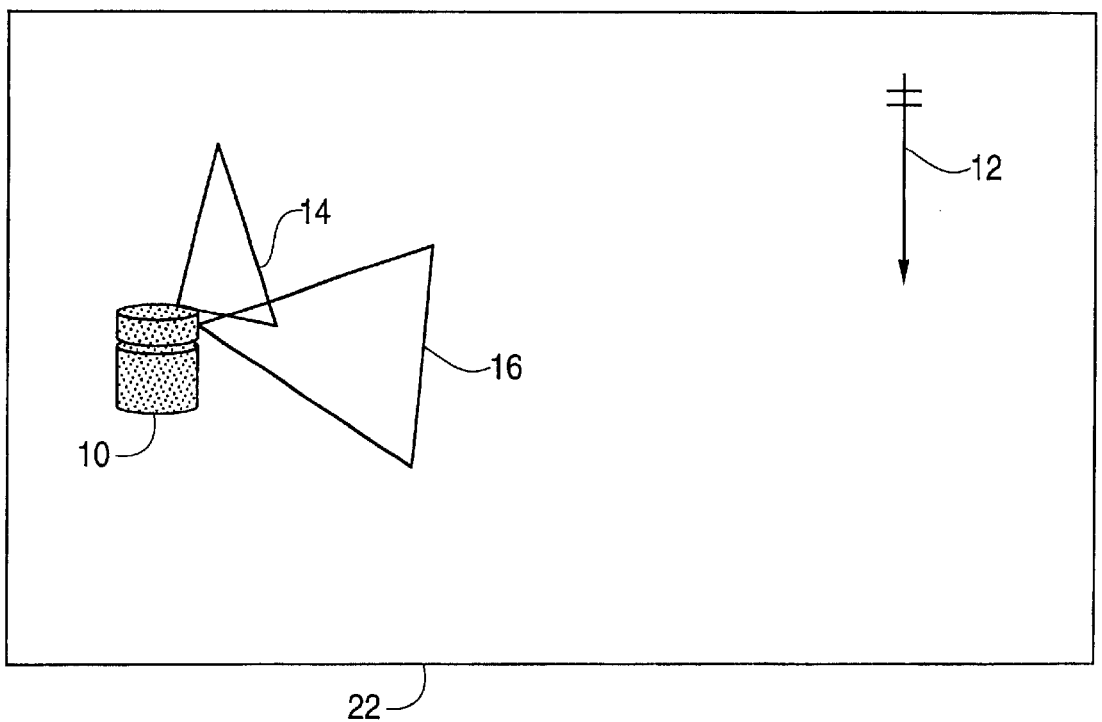
FIG. 5 is a plan view of a rectangular shaped work area.

FIG. 5 depicts a rectangular shaped work area 22 that contains a rotatably mounted transmitter 10 and a selectively positionable light responsive detector/receiver 12. To obtain accurate position data using the improved single transmitter 10 it is necessary to create an optical plane which is level with respect to gravity. Transmitter 10 normally creates a plane that is perpendicular to the axis of shaft rotation and in this plane the time of revolution between the two laser fan beams 14 and 16 is constant and has the value theta-offset which is determined during calibration. Accuracy is improved when the transmitter 10 is adjusted so that the optical plane is also a level plane. This can be accomplished during the manufacturing process, however a more efficient and cost effective approach is to employ an automatic leveling process. Those skilled in the optical measurement arts will be familiar with several leveling techniques commonly employed which consist primarily of a gimbaled apparatus that allows the transmitter to be adjusted in the field. When an auto leveling technique is employed, the calibration process would be modified to utilize two mid photo detectors that are leveled with respect to each other and to gravity. In order to simplify the calibration calculations the two mid level detectors should be at slightly different ranges and angles to allow the level of the transmitter being calibrated to be determined precisely. In certain applications of applicants' improved single transmitter it is desirable that an absolute azimuth reference be available on the transmitter 10. In that case a calibration fixture should be augmented along with the transmitter 10 to create a fiducial, normally with the addition of an alignment pin in the bottom of the transmitter. Through use of the fiducial, the transmitter can be precisely aligned in the calibration facility which can determine the angle to the absolute encoder index. That information is then used as part of the calibration data for that transmitter 10 and is passed on to any receiver 12 in the system during the setup procedure.

As the transmitter head 10 rotates in operation the two fan beams 14, 16 shown in FIGS. 1 and 5 scan the measurement field 30 and illuminate the receiver/detector 12 when the fan beams 14, 16 and hereinabove describe strobe reference pulse strike the receiver/detector 12 sequentially.

Figure 6:
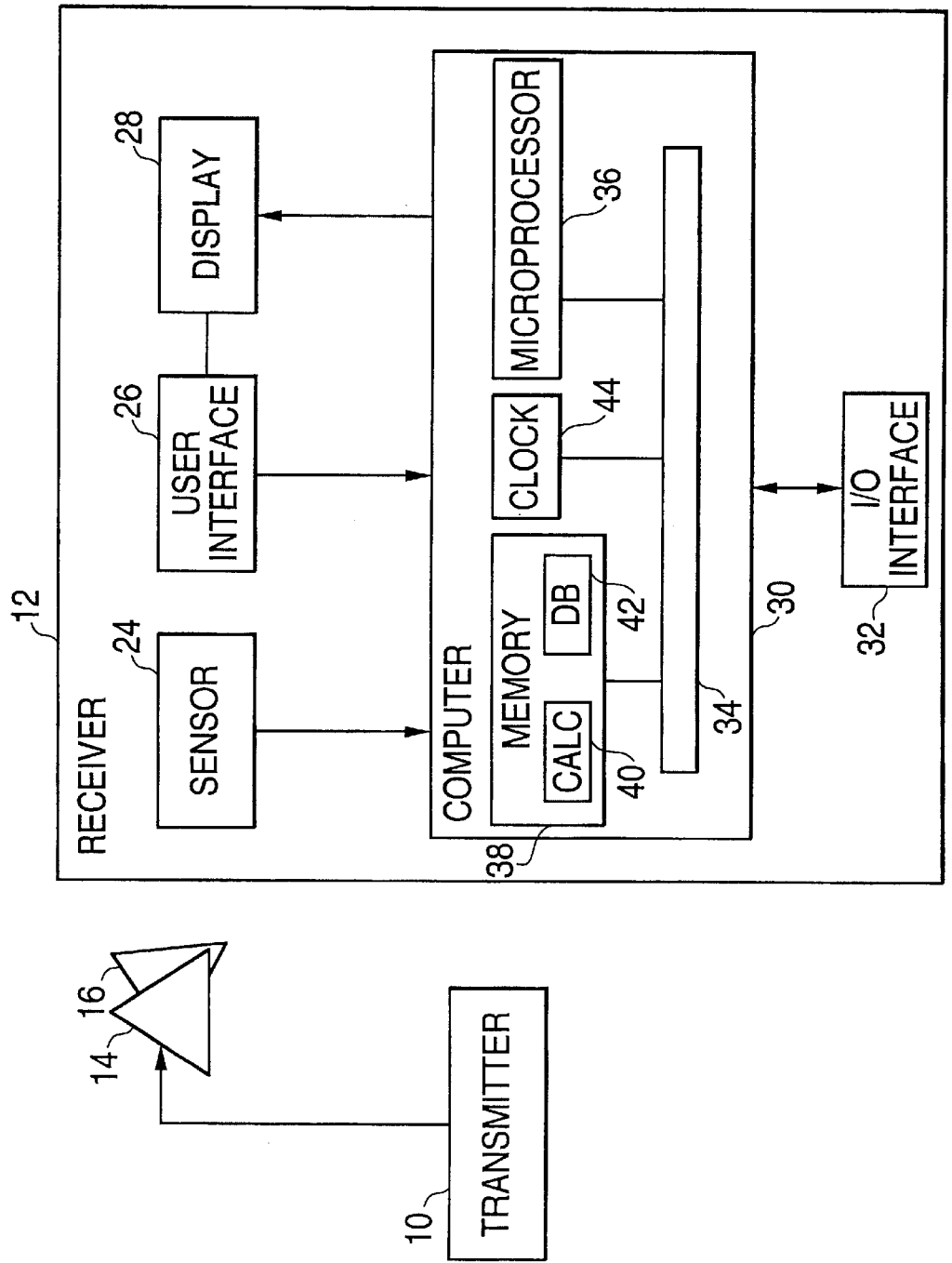
FIG. 6 is a block diagram of a receiver for determining azimuth and elevation of an object or point within an area.

FIG. 6 is a block diagram of the receiver 12 for determining azimuth and elevation of an object or point within an area 30. The receiver 12 contains a light sensitive sensor 24, a user interface 26, a display 28, a computer 30, and an optional input/output interface 32.

The sensor 24 is preferably a broadband detector. More preferably the sensor 24 is a photodetector, and more preferably a silicon photodetector. The sensor 24 can detect both the laser fan beams 14, 16 and the strobe reference pulse.

The user interface 26 can be any input device that allows a user to interact with the receiver 12 such that information can be input to the receiver. For example, a user interface 26 can be one or more of a keyboard, a pointing device, a joystick, a tactile interface, and an audio receiver. In the preferred embodiment, the user interface 26 is a tactile interface that enables a user to maneuver through a menu system, for example scrolling, and make desired selections. The preferred tactile interface may include any of a pointing device, a joystick-type device and a keyboard or numerical pad.

The display 28 can be a CRT monitor, an LCD monitor, a printer, a projector and screen, or any other device that allows a user to visually observe images.

The computer 30 contains a bus 34 connecting a processor 36, a memory 38 and a high speed clock 44.

As shown in FIG. 6, the processor 36 is preferably implemented on a general purpose computer. However, the processor 36 can also be implemented on a special purpose computer, a programmed microprocessor or microcontroller and peripheral integrated circuit elements, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine that is in turn capable of implementing the flow charts shown in FIGS. 10–16, can be used to implement a processor 36.

The memory 38 is preferably implemented using static or dynamic RAM. However, the memory 38 can also be implemented using one or more of static RAM, dynamic RAM, ROM, flash memory, hard disk drive, CD-ROM drive, CD-RW drive, Floppy Disk Drive, or the like.

The memory 38 stores a position calculator program 40 and a database 42. The position calculator program 40 can be any program capable of implementing of the flow charts shown in FIGS. 10–16. The program 40 can be written in any language compatible with the processor 36.

The database 42 contains calibration data regarding the transmitter 10. The calibration data can be input into the database 42 at the time of transmitter calibration, can be input into the database by the user via the user interface 26, or can be uplinked into the database using an input/output interface 32.

The input/output interface 32 can be any communications interface, for example, a network card, a dial-up modem, a parallel port, a serial port, a universal serial bus port, an infrared port, or any other type of communications interconnector.

The high speed clock 44 allows for time-tagging of the received pulses, which allows for the conversion to scan angles of the two fan beams 14, 16.

As will be understood by one of skill in the art, the receiver 12 can be packaged in many different ways and in many different shapes and sizes. For example, receiver 12 can be in the shape of a hand-held personal computing device, a brick, a projectile discharging device, or integrated with a wearable unit such as a visor wherein a display is projected on the visor or a wristband apparatus. Essentially any shape that allows a user to position and operate the receiver 12 as intended is an acceptable package. Electrical power needed to operate the receiver 12 can be supplied via an AC power cord plugged into an outlet, not shown, or an energy storage device, for example a battery not shown, associated with or integrated with the receiver 12.

Figure 7:
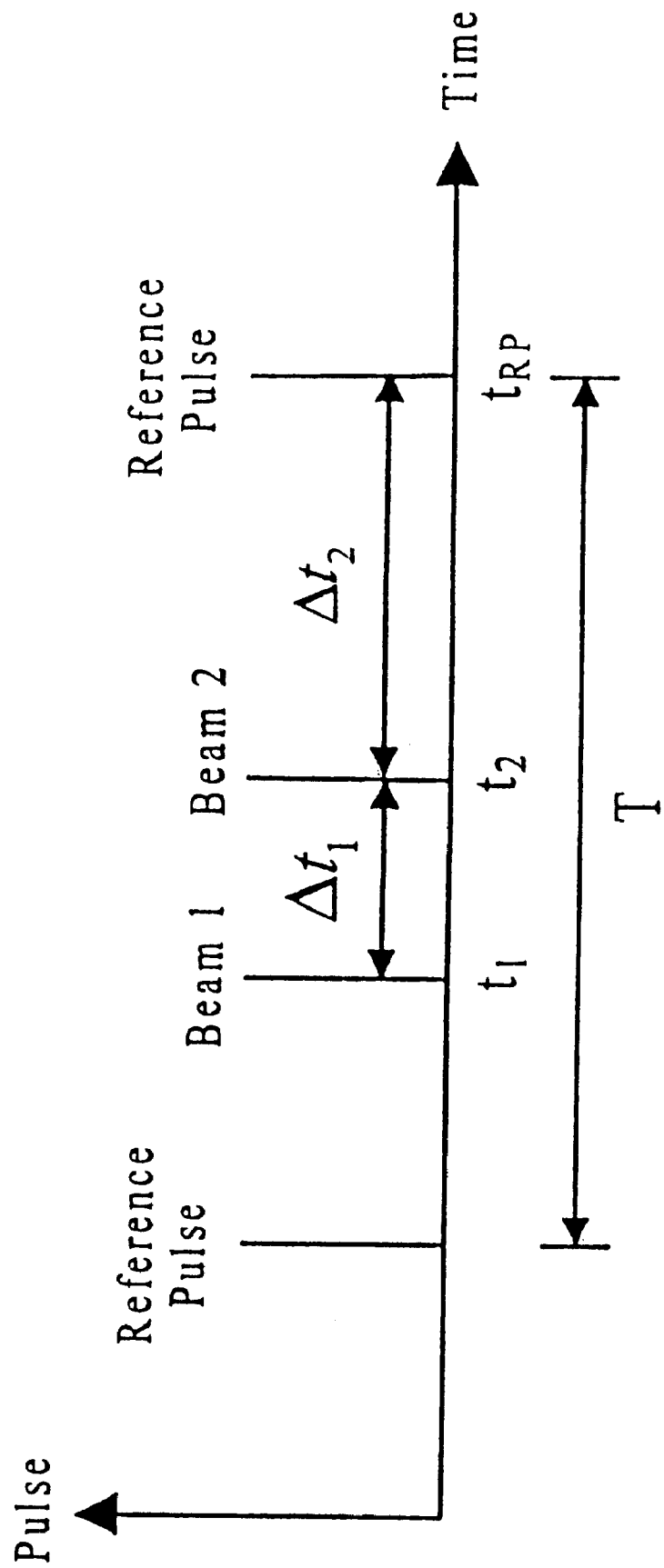
FIG. 7 illustrates the pulse sequence as a function of time.

In a manner to be hereinafter fully described the detector/receiver 12 is operably associated with a computer 30, a position calculation program 40, a display 28 and the user interface 26. In this manner as the user, or system operator selectively positions the detector/receiver unit 12 within the work area 22, the position calculation program 40, as will hereinafter be described, generates the desired or selected position data. The desired or selected position data is selected by the user by way of the user interface 26 and display 28. In the preferred embodiment, a user can select the desired results by selecting from a menu on the display 28. Referring now to FIG. 7 we will now discuss how the detector/receiver 12 calculates position data based upon the hereinabove described scan angles $\Phi_1$, $\Phi_2$ for the two laser beams 14 and 16 of transmitter 10.

FIG. 7 illustrates the pulse sequence as a function of time received by detector 12. As shown, a typical pulse sequence for a single rotation of the optical transmitter 10 wherein the time between reference or strobe pulses, as indicated by T, is the period of one revolution of transmitter 10. As stated above, the reference or strobe pulse is periodically created, preferably once per revolution of transmitter 10. Between each pair of reference pulses receiver/detector 12 makes two differential timing measurements, t1 and t2, for each revolution of the optical transmitter 10. These timing interval measurements correspond to the times at which the sensor 24 of the receiver 12 is struck or illuminated by the fan beams 14 and 16.

Figure 8:
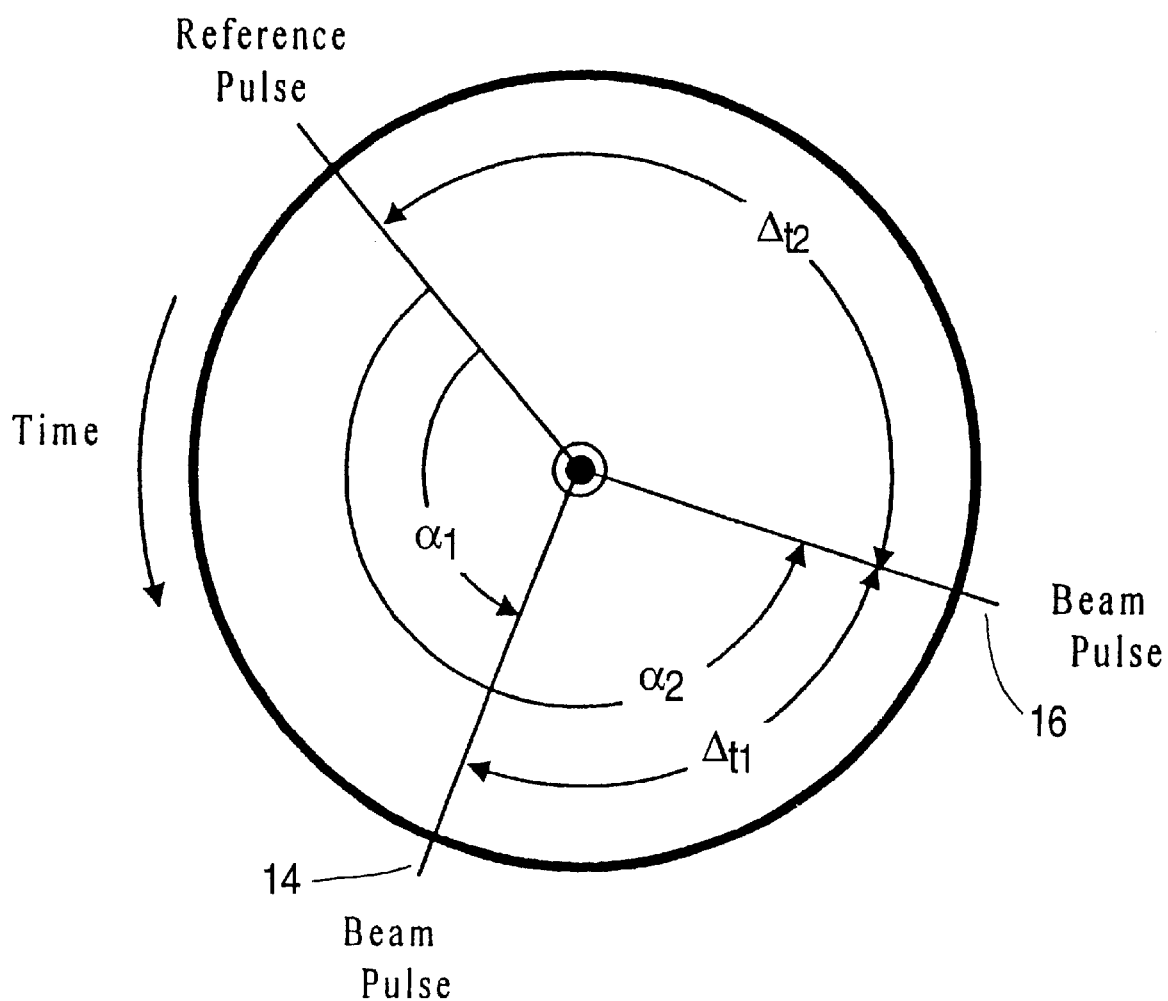
FIG. 8 depicts a polar-type plot of the pulse sequence as received by the sensor during a single revolution of the transmitter.

FIG. 8 depicts a polar-type plot of the pulse sequence as received by the sensor 24 during a single revolution of the optical transmitter 10. The time differences between the receipt of pulses can be related to angular differences for one revolution of optical transmitter 10. This is accomplished by taking the pulse plot in time and viewing it as a circle of two π radians representing one revolution of the optical transmitter 10. The two angular measurements, $\alpha_1$ and $\alpha_2$ can be defined as the angles between the optical reference pulse signal detection and the first fan beam 14 and second fan beam 16 detection pulses, respectively. The reader is cautioned that this circular representation should not be confused with actual optical head rotation. This circular plot depicted in FIG. 8 illustrates by example in time and angle the relative position of pulses viewed by the sensor 24.

Figure 9:
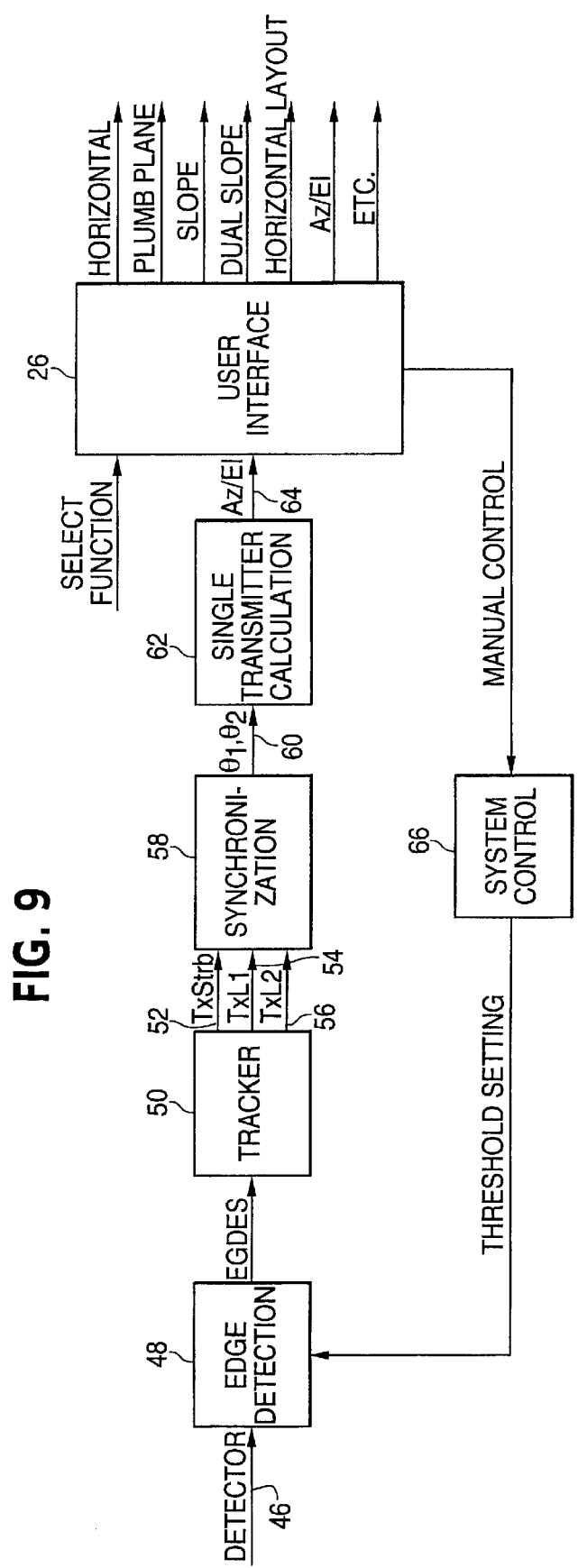
FIG. 9 depicts a schematic logic block diagram of the receiver.

FIG. 9 depicts a schematic logic block diagram of receiver 12 that enables the position calculation program 40. As will be known by those skilled in the art, various commercially available computers which have associated memory for storing firmware or other software may be utilized for translating the received or incoming pulses into position data. As hereinabove described in applicants' improved measurement system only a single optical transmitter 10 and a single receiver 12 are utilized. Therefore the task of separating pulses or sequences from different transmitters is simplified or eliminated. As will be understood by those skilled in the art, from the perspective of any one fixed location in the workplace, the transmitter 10 in applicants' system emits a periodic stream of light pulses and within one period, three pulses are emitted from said transmitter. Output 46 from the sensor 24 is converted to a series of impulses by the edge detector logic 48, which activates tracker logic 50. The tracker logic 50, based in part on the optical transmitter calibration data described above, separates the pulses relating to the strobe pulse 52, first fan beam detected pulse 54 and second fan beam detected pulse 56 respectively, which are then synchronized 58 under the timing control of the position calculation program 40. Synchronization circuit output 60 provides angular data necessary for the single transmitter calculation logic 62 to generate azimuth and elevation data which is output 64 to the user interface unit 26.

In the preferred embodiment, the user/operator may select stored firmware associated with the position calculation program 40 to initiate generating the various functional computations of the data thus generated, e.g. slope, dual slope, elevation angle, azimuth, etc. The operator also controls the system sensitivity by activating the system control 66 to set the desired threshold setting to eliminate extraneous noise, spurious signals, etc.

The flowcharts depicted in FIGS. 10–16 describe the steps used in translating the incoming pulse times into physical positions in space. As stated above, these steps can be performed using software or firmware, or a combination of software and firmware. Additionally, each transmitter 10 has a unique and stable period, or rate of emission of the fan beams 14, 16 and strobe flash, determined during transmitter calibration. This calibration information allows the receiver 12 to distinguish between transmitters if there is more than one in the field of view.

A tracking algorithm maintains an individual pulse tracker for each emitter on each transmitter 10. When a pulse is received by the receiver 12, its timing characteristic is compared with each of the pulse trackers in the system in an attempt to associate it with a known pulse train. There are two distinct phases to the tracking process; synchronization and tracking. During the synchronization phase, an attempt is made at pairing unknown pulses, within the preset parameters of the existing pulse trackers. Once this is accomplished, the tracking mode is entered, whereby successive pulses are associated with their assigned pulse trackers. If a sequence of assignment failures occurs, tracking mode is exited, and resynchronization is attempted.

Once synchronization is achieved, a post-synchronization check is performed to ensure that the pulses have been identified in the correct order. If an inconsistency is found, the pulse trackers are swapped. This helps to avoid unnecessary re-synchronization cycles.

Under some conditions, environmental interference such as noise and multipath reflections are experienced. A noise pulse is defined as a pulse that cannot be correlated with the period of an existing pulse tracker. Multipath occurs when unexpected pulses are detected at the period of a transmitter.

Figure 10:
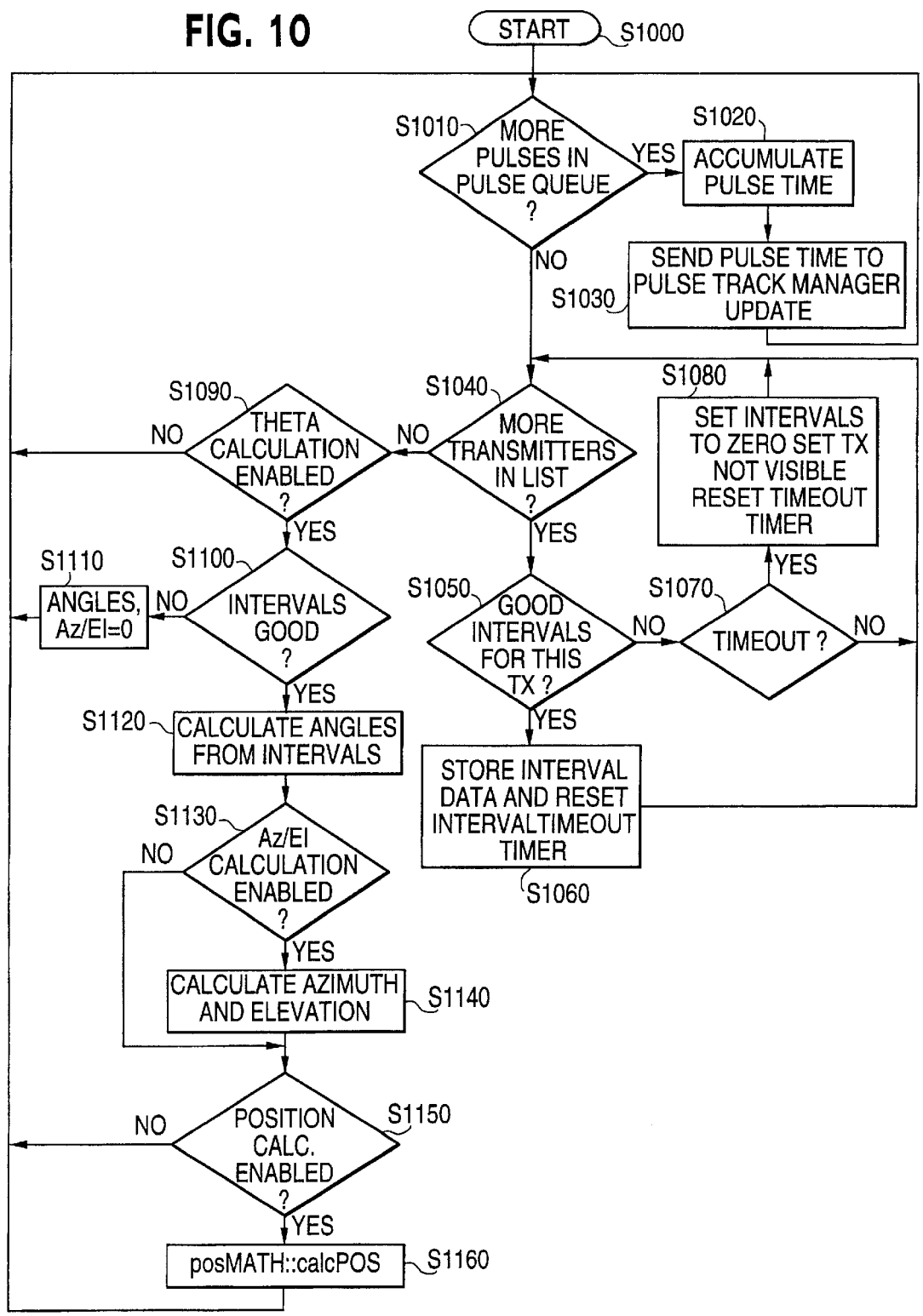
FIG. 10 is a flowchart of depicting the Detector:Entry function.

The function Detector:Entry is depicted in FIG. 10, and contains the main background loop for the system. It is a Real Time Operating Task, and once launched at step S1000, continues to execute in an infinite loop.

At step S1010, a check for pulse time events in the queue occurs. If there is another event in the queue, the process continues to step S1020, where it is added it to the accumulated total time, and continues to step S1030. At step S1030, the pulse time is passed through to the update routine at step S2000 shown in FIG. 11. The update routine generates pulse intervals from the incoming pulse times. It also associates the pulses with a particular transmitter, and returns to step S1010.

When the queue in step S1010 has been emptied, the process continues to step S1040. In step S1040, it is determined whether there are multiple transmitters. This is done to make sure that new intervals have been calculated for every transmitter. If there are additional transmitters, continue to step S1050. In step S1050, determine if the intervals for the transmitter are valid, and if they are, store the interval data and reset the interval timeout timer in step S1060, and return to step S1040. If the intervals in step S1050 are not valid, note a timeout in step S1070, and mark the associated transmitter as invisible in step S1080. This will be displayed on the user interface.

Once all transmitters have been updated with interval information, check to see if theta calculations have been enabled in step S1090. Thetas are the equivalent angles between the lasers and the reference pulse based upon pulse times and transmitter rotational rate. This is a basic calculation required for any subsequent calculations, and must be enabled for any output to be generated. If they are disabled, go back to looking for more pulse times at step S1010. If the theta calculation is enabled, continue to step S1100. In step S1100, check that all interval data is valid. If not, clear the theta and azimuth/elevation data in step S1110, and continue to step S1010 and check for new pulse times.

If the intervals are good in step S1100, continue to step S1120 and perform the calculation to convert angles (thetas) into intervals, and continue to step S1130. In step S1130, if the azimuth and elevation calculations are enabled, generate the azimuth and elevation in step S1140, and continue to step S1150. If the azimuth and elevation calculations are not enabled, continue to step S1150.

In step S1150, if the position calculation is enabled, calculate the position (x,y,z) of this receiver 12, and send a message to the measurement tool indicating that a position has been generated for this receiver in step S1160, and continue to step S1010 and check for new pulse times. If the position calculation is not enabled in step S1150, continue to step S1010 and check for new pulse times.

Figure 11:
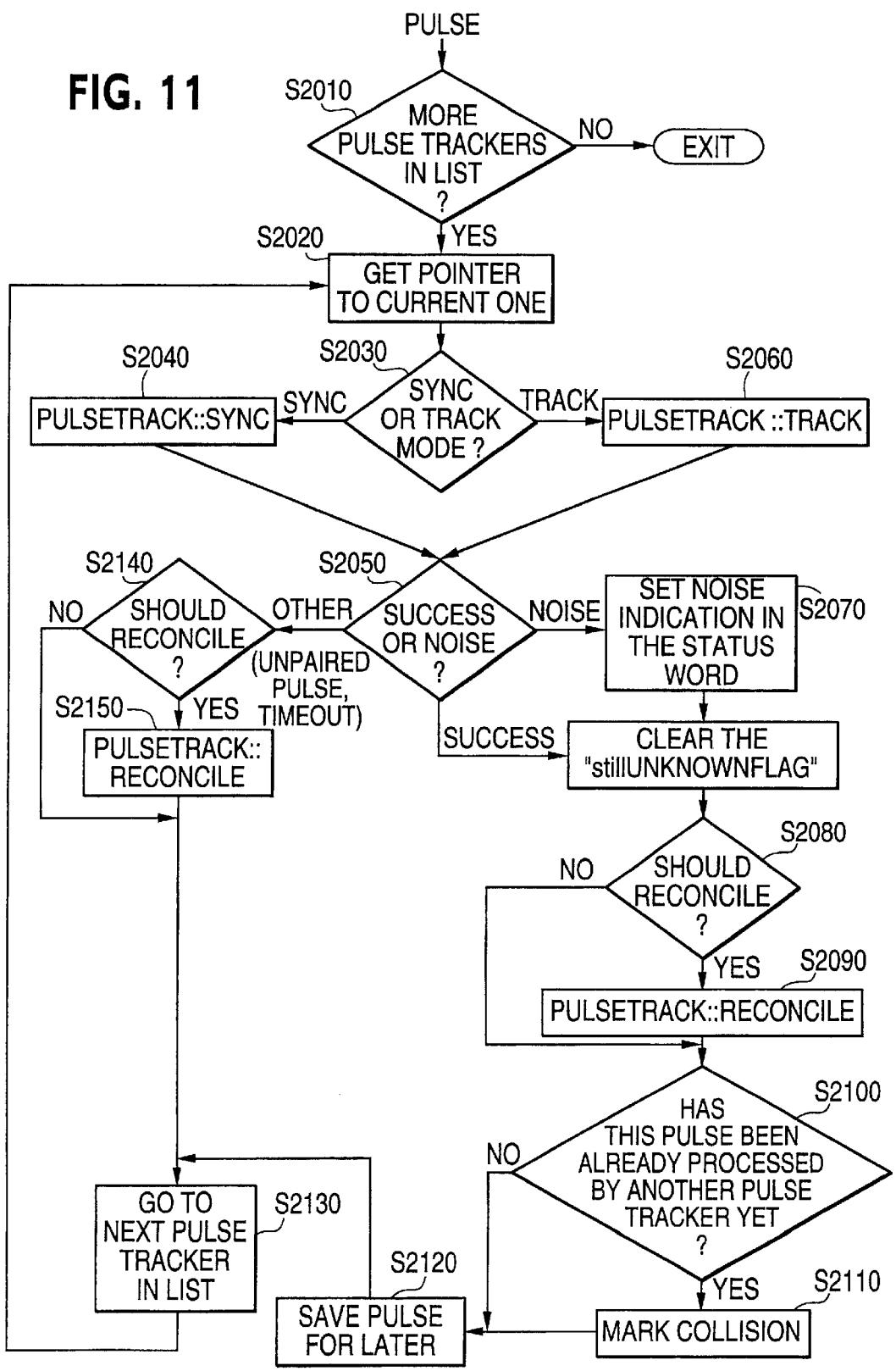
FIG. 11 is a flowchart of depicting the PulseTrackManager:Update function.

The PulseTrackManager: Update is depicted in FIG. 11, and receives pulse times from step S1030 and associates the pulses with a pulse tracker. An individual pulse tracker exists for each particular transmitter. These include each laser (two per transmitter), and each reference pulse generator (one per transmitter). This accomplished, an attempt is made to reconcile a set of 3 pulses and associate them with a single transmitter.

The sequence of events is as follows, until a pulse is identified. After a pulse is received at step S2000, it is determined in step S2010 whether there are more pulse trackers in the list. If there are more pulse trackers, the process continues to step S2020 and the pointer is placed at the current pulse tracker, and continues to step S2030. In step S2030, it is determined whether the receiver is in synchronization mode or track mode. If currently in synchronization mode, call the synchronization function in step S2040. And continue to step S2050. If currently in track mode, call the track function in step S2060, and continue to step S2050.

If noise was detected in step S2050, set the noise flag in step S2070. If the synchronization in step S2040 or track function in step S2060 was successful, check to see if a previous pulse is to be reconciled in step S2080. If yes, call the reconcile routine in step S2090 which will perform pulse pair housekeeping, and continue to step S2100. If not, continue to step S2100. If this pulse has already been processed by another pulse tracker in step S2100, a collision has occurred, and the collision flag should be set in step S2110, and continue to step S2120. If a collision has not occurred in step S2100, continue to step S2120. In step S2120, the pulse is saved for later, and will be used to reconcile the next pulse from this transmitter. The process continues to step S2130 and proceeds to the next pulse tracker on the list.

If the synchronization in step S2040 or track function in step S2060 was not successful at step S2050, the process continues to step S2140. This could have been caused by a timeout. The pulse should be reconciled at step S2150 so that the interval from the previous pulse gets recorded, and continues to the next tracker at step S2130.

Once all pulse trackers have been attempted, if the pulse has been identified, exit at step S2160. Otherwise, continue at step S2020. Additionally, for each pulse tracker, check to see if we have exceeded the maximum number of sync attempts. If so, reset this tracker, and go to the next one. If it has recently been synchronized go on to the next one. If multipath interference has not been detected, go on to the next pulse tracker. Otherwise, clear out the unknown pulse list, and insert this one into it.

Figure 12:
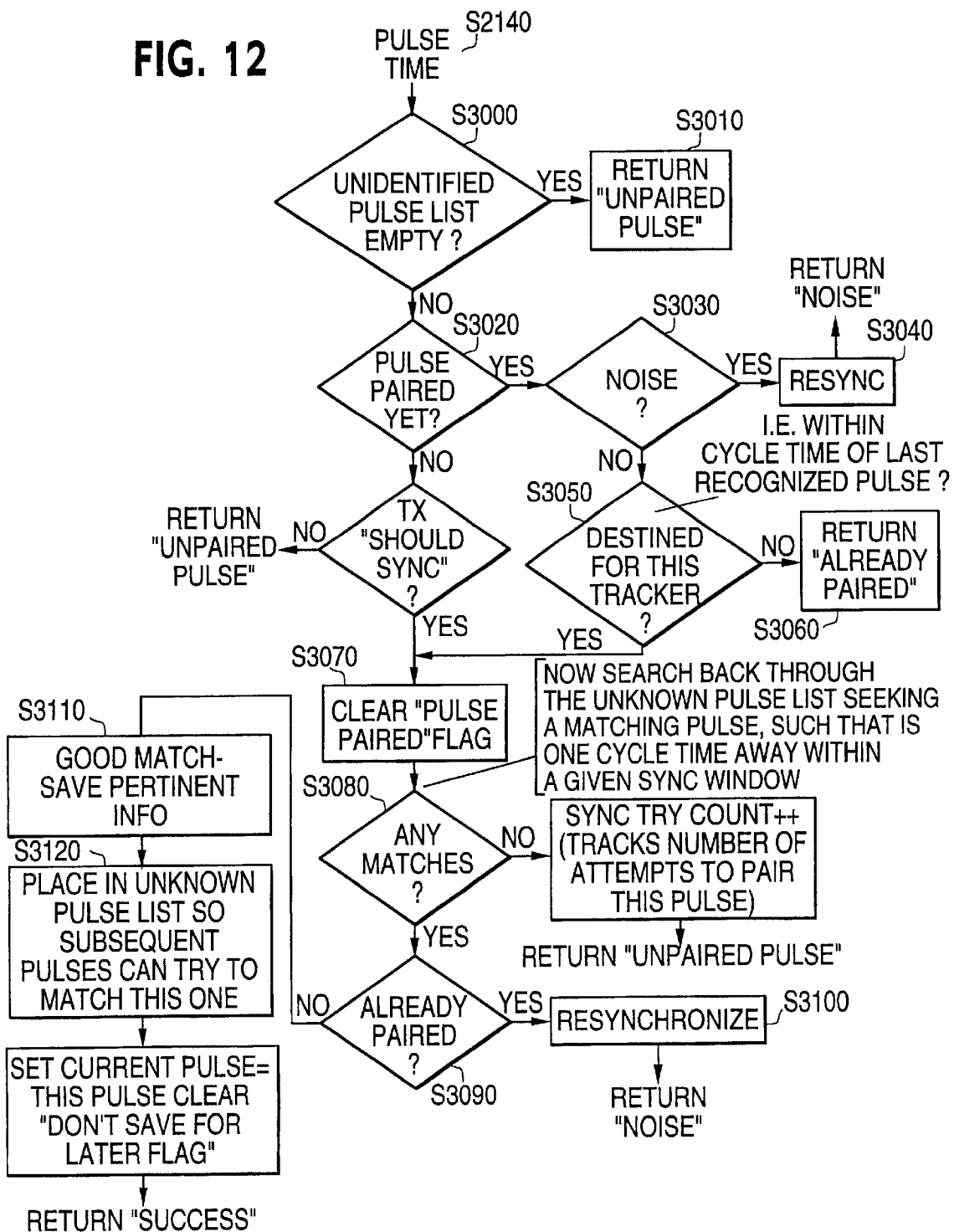
FIG. 12 is a flowchart of depicting the PulseTrack:Synchronize function.

PulseTrack: Synchronize is depicted in FIG. 12. This function attempts to associate an incoming pulse with an existing pulse tracker. Once a regular pattern of pulses has been established, the system leaves sync mode and enters track mode, whereby the track routine is invoked instead of the synchronization function. As long as the track routine continues to successfully classify incoming pulses, the synchronization function is no longer called. Should the track routine encounter difficulty in associating pulses, synchronization mode is re-invoked, and the system attempts to re-synchronize the pulse stream. Loss of synchronization may occur for number of reasons, including noise or reflections in the environment, or rapid movement of the measurement tool.

In step S2140, the new pulse time of arrival is registered, and continues to step S3000. If the unidentified pulse list is empty in step S3000, there is nothing with which to pair it, and is returned at step S3010. If there is a pulse in step S3000, then the query is made in step S3020 whether the pulse been paired yet with another pulse tracker? If yes, the process continues to step S3030. If yes, is the interval from the previous pulse within the sync window? If it is, the previous pulse may have been noise, and the process continues to step S3040 for Resynchronization. A sync window is defined as the time it takes for the transmitter head to complete approximately 0.2% of a rotation.

If the last pulse was NOT noise in step S3030, continue to step S3050 and determine whether this is one within the cycle time of this tracker? If not, return "already paired" in step S3060. If yes, continue to step S3070 and clear any pulse paired flag, and continue to step S3080. In step S3080, try to find a match in the unknown pulse list. Note that if it has not been paired yet, we also end up looking in the unknown pulse list.

If a match is found in step S3080, see if the match has been already paired in step S3090. If the match was paired in step S3090, resynchronize at step S3100. Otherwise, save as a match in step S3110, and place this one in the unknown pulse list at step S3120, so subsequent pulses can try to match this pulse.

Figure 13:
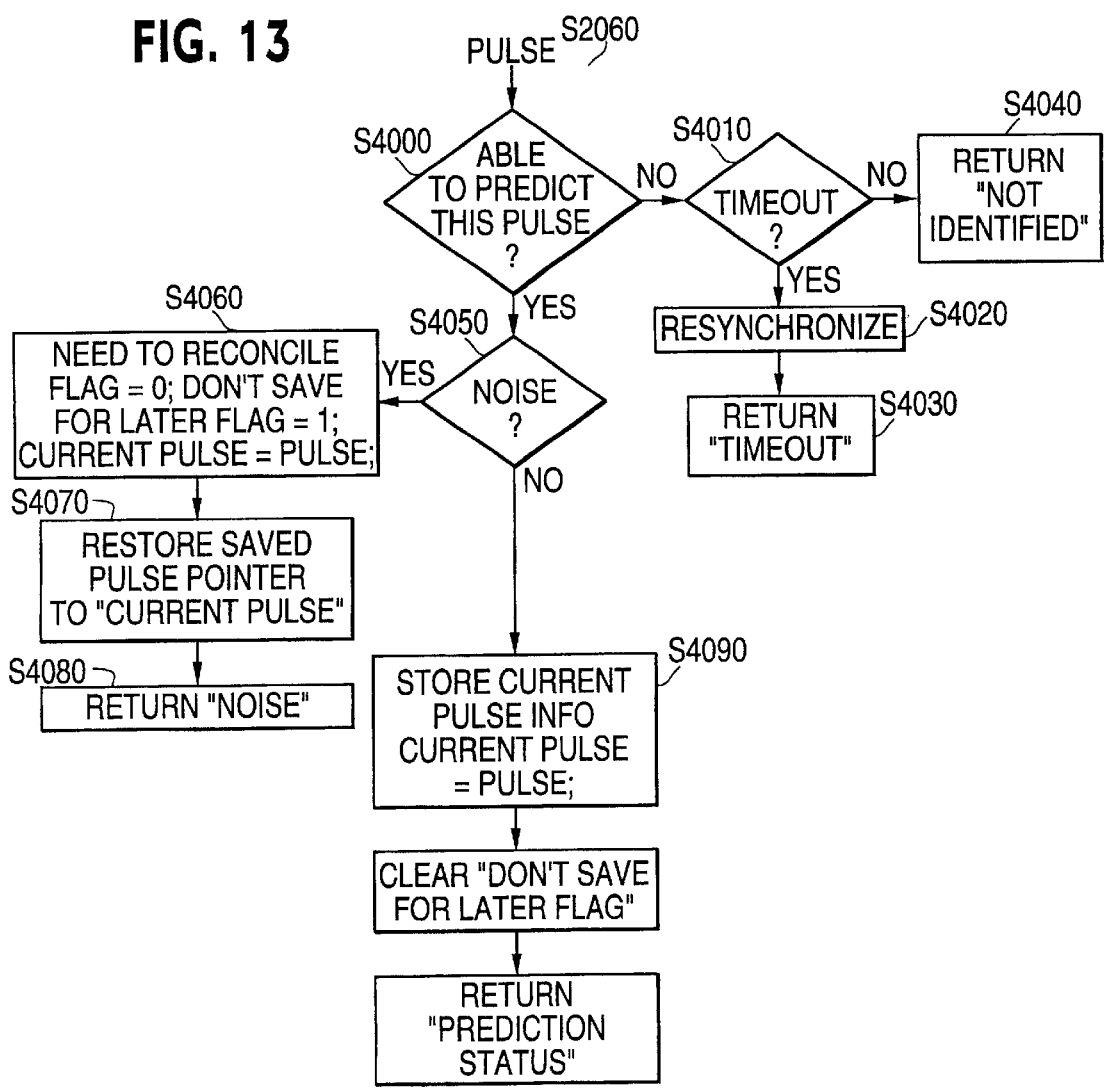
FIG. 13 is a flowchart of depicting the PulseTrack:Track function.

PulseTrack: Track is depicted in FIG. 13. Once the receiver is in tracking mode, each pulse gets passed to the pulse trackers. If it is within the expected range of when the next pulse should occur, it is accepted as the next pulse for this tracker.

In step S2160 the pulse is received, and continues to step S4000. In step S4000, it is determined whether the pulse can be predicted within a reasonable tracking window. If not, the process continues to step S4010, and the query is made whether it has it been too long since the last pulse was registered. If yes, resynchronize occurs at step S4020 and a timeout is return in step S4030. If no timeout yet in step S4010, not identified is returned in step S4040. A tracking window is defined as the time it takes for the transmitter head to complete approximately 0.2% of a rotation. If the pulse can be predicted in step S4000, go to step S4050 and determine if noise is present. In this case, noise is defined as multiple pulses within the track window. If yes, reset pointer to previous pulse in steps S4060 S4070, and return noise in step S4080.

If noise is not detected in step S4050, store current pulse information in step S4090, and return success.

Figure 14:
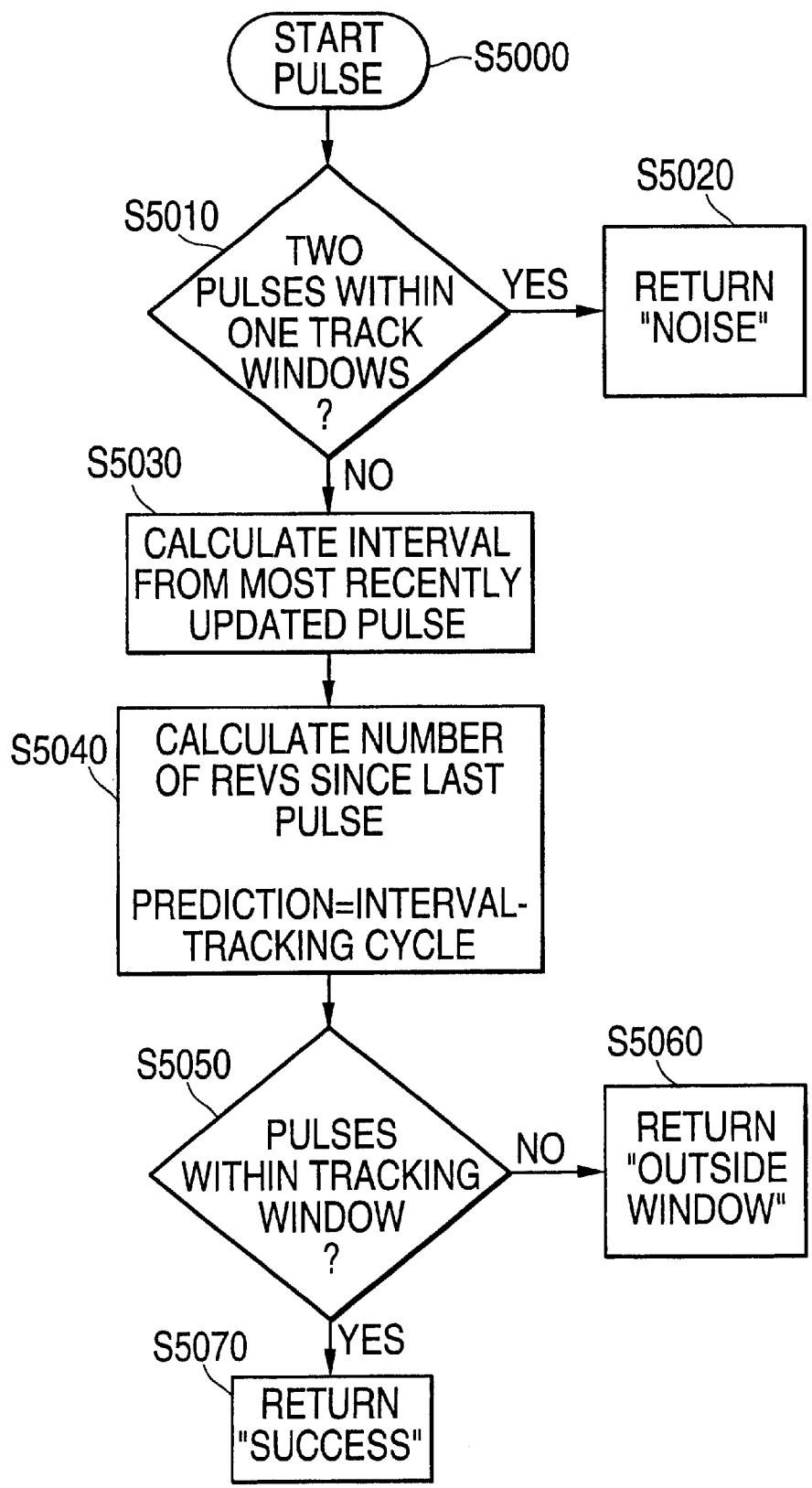
FIG. 14 is a flowchart of depicting the PulseTrack:Predict function.

PulseTrack: Predict is depicted in FIG. 14. This function predicts when the next pulse should occur. It then tries to correlate this expected time with the next actual pulse time, within a pre-determined tracking window.

When a pulse is received at step S5000, the process continues at step S5010. At step S5010, it is determined whether there are two pulses within one tracking window. If yes, return noise in step S5020. If no, continue to step S5030. In step S5030, the interval from the most recently updated pulse is calculated, and at step S5040 the number of revs since the last pulse is calculated, and continues to step S5050. Based on previous pulses, is this pulse within a reasonable tracking window of one or more, most recent pulses in step S5050. It should be noted that several pulses may be missed before tracking fails; for example, as may be experienced during a temporary obstruction or blockage. If not, return outside window in step S5060. If yes, return success in step S5070.

Figure 15:
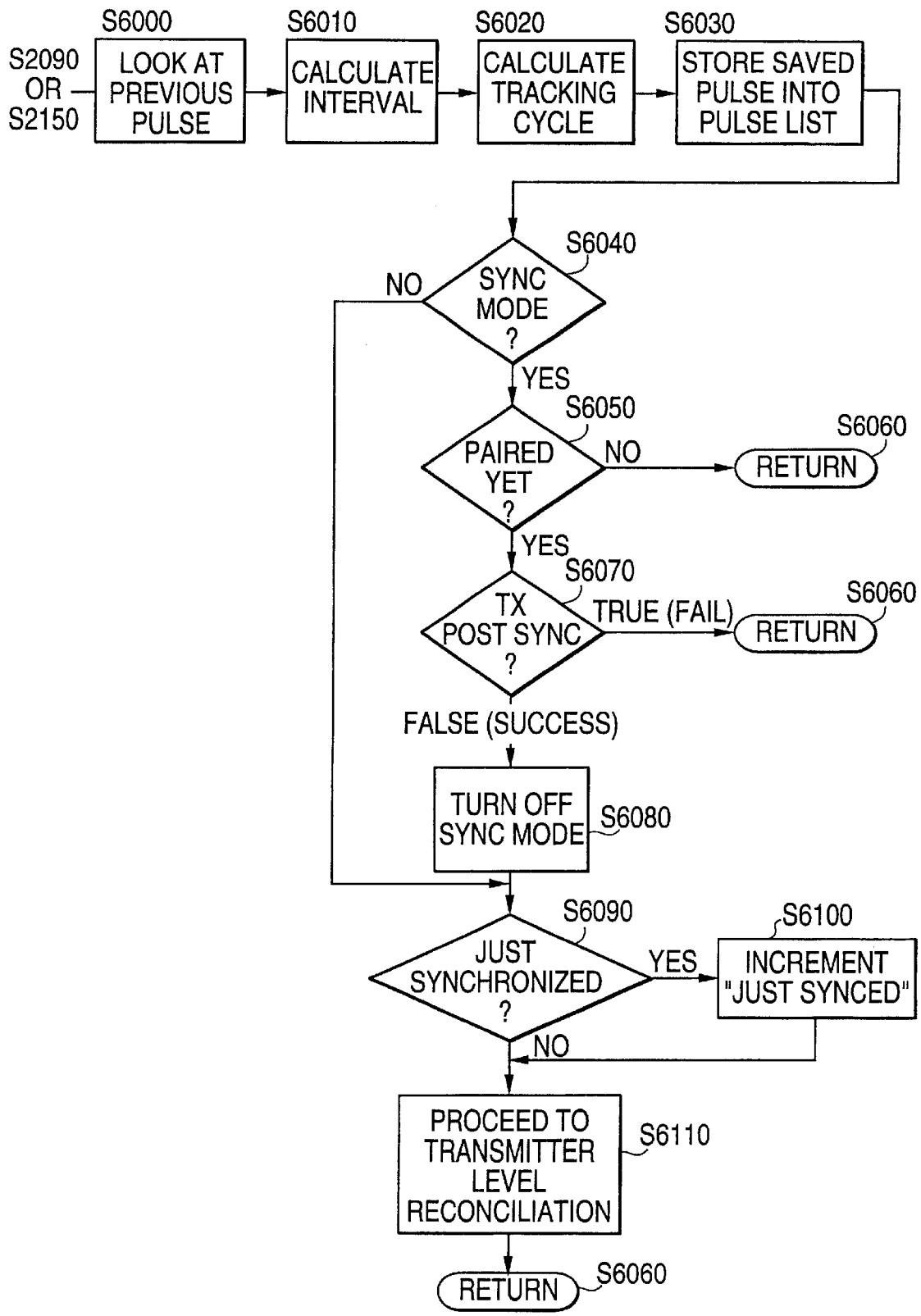
FIG. 15 is a flowchart of depicting the PulseTrack:Reconcile function.

PulseTrack: Reconcile is depicted in FIG. 15. Reconciliation occurs in two phases. The first part is pulse tracker reconciliation, which performs pulse pair housekeeping within a particular pulse tracker. The other is transmitter level reconciliation, which associates a set of three pulses from a single transmit period with a transmitter.

First, the pulse enters step S6000 from either step S2090 or S2150 when it is determined that reconciliation should occur, and continues to step S6010. In step S6010, the interval from the previous pulse is calculated, and the tracking cycle is calculated in step S6020, and continues to step S6030. In step S6030 the saved pulse is stored in a list, and a query is made in step S6040 whether the receiver is in synchronization mode. If in synchronization mode, continue to step S6050 and determine if the pulse is paired. If in sync mode, and not paired yet, return at step S6060. Otherwise, continue to step S6070 for "post-sync" to do cleanup. If it is unsuccessful, return as such at step S6060.

If the "post-sync" was successful in step S6070, continue to step S6080 and turn of synchronization mode and switch back to track mode. If it was in "track" mode already, check to see if it was recently achieved in step S6090. If yes, increment the counter in step S6100. This affects the way the "update" routine handles the data.

If no, reconcile at the transmitter level in step S6110 and return at step S6060.

For Transmitter::Reconcile, the following steps occur. If this is the reference pulse, check that there are two laser pulses in the list. If so, a new cycle time is calculated and returned. Otherwise, just return. If it is a laser pulse, make sure there are good pulses from all 3 pulse trackers for this transmitter. Using the pulse time data, calculate the intervals. Save the interval times for use by position calculation routines.

Post Synchronization is used as a final check to make certain that three trackers have synchronized to a single transmitter in a consistent manner. This can be performed by first determining that all three trackers have completed synchronization. Using the reference pulse period, check that the cycle time is reasonable. If not, then re-enter the synchronization mode and return an error. Ensure that the pulses have been identified in the correct order. If not, then swap them based upon time of arrival. Check that we're locked onto the correct set of pulses. If not, then re-enter the synchronization mode and return an error. Otherwise, return "success".

Figure 16:
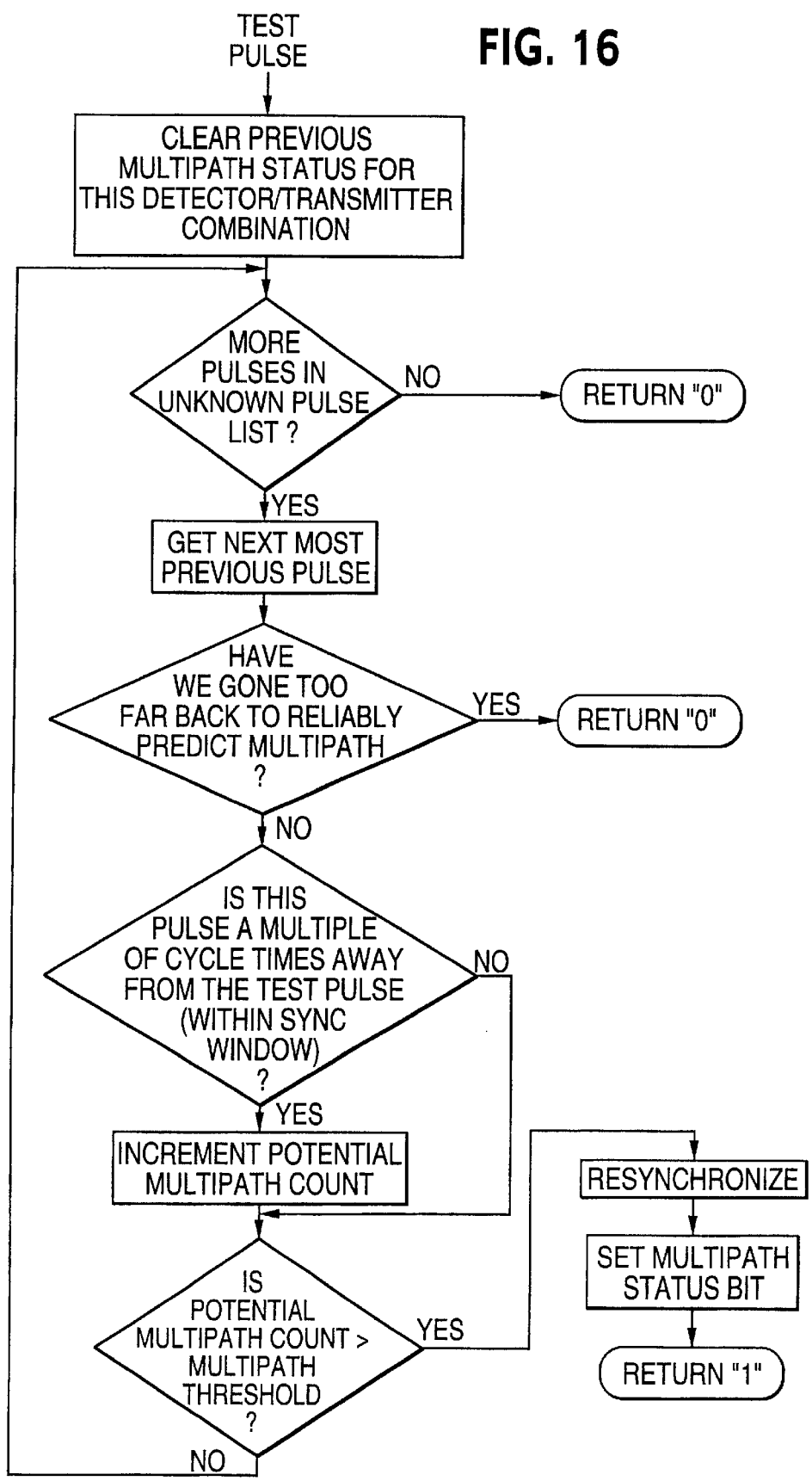
FIG. 16 is a flowchart of depicting the PulseTrack:Multipath function.

PulseTrack::Multipath is depicted in FIG. 16. This function checks to see if multipath interference exists; that is, whether some pulses reaching the detectors are reflections of the emitters rather than "line of sight" pulse strikes. This is accomplished by comparing the pulse currently being classified with previous pulse times. First, any previous multipath indications in the status word are cleared. If the unknown pulse list is empty, multipath is not detectable.

The pulse time of this pulse is compared with the pulse times of prior entries in the unknown pulse list. If this pulse is a multiple of cycle times away from a previously received but unidentified pulse within a sync window, then multipath interference may be present, and the counter is incremented. If the counter exceeds a preset limit, multipath exists. Set the multipath status bit, and re-enter synchronization mode.

Operation of the transmitter 10 and the receiver 12 to produce position information will now be described.

The transmitter 10 must be positioned and set-up before any position information can be calculated. The desire is to position the transmitter 10 over a point of interest, for example the location of a corner of a floor or wall. First the transmitter 10 must be leveled and then it is moved in the xy plane (with z being parallel to gravity) until it is over the point of interest. In the preferred embodiment, the transmitter is self-leveling and includes an optical plummet. The optical plummet in transmitter 10 involves a laser aligned to the spin axis of the transmitter. The laser shoots down a laser beam to the ground. To position the transmitter, the user simply moves the transmitter in the xy plane until the laser is coincident with the point of interest.

If azimuth measurements are to be made, the transmitter 10 can then be backsighted to establish a reference angle against which additional azimuth angles can be measured. As explained below, the reference azimuth angle of the transmitter can be defined as the average of where the two fan beams 14, 16 are when the strobe pulse is generated. Because the strobe pulse fires once per revolution of the rotating laser head, the two fan beams, and therefore the reference angle, should always be in the same location.

In order to measure the elevation angle of a particular point, the receiver 12 must be placed so that at least one of the sensors 24 or some defined point above or below them is at the point to be measured. Notably, in order to measure elevation, only one sensor 24 is needed, and the transmitter 10 need not emit a strobe pulse. The receiver 12 only needs to receive the two fan beams 14, 16 at the sensor 24.

The elevation is calculated by measuring the time between the arrival of the two fan beams 14, 16 at the sensor 24. Several techniques are available for determining the elevation using the timing information and the transmitter calibration information (phi1, phi2 and Theta-offset). Assuming that the transmitter is level, the elevation can either be found through table look-up or through an analytic algorithm.

Figure 17:
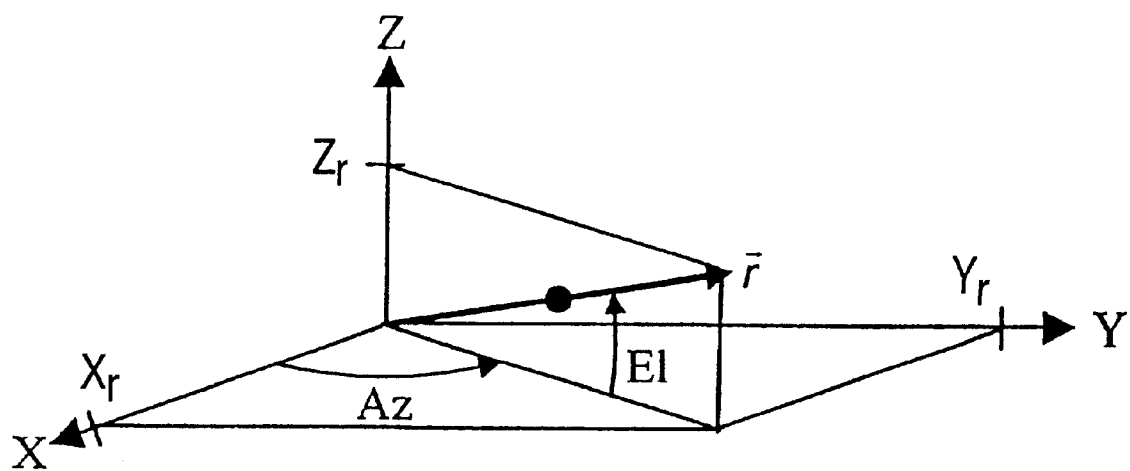
FIG. 17 depicts a Cartesian plot of r for defining elevation and azimuth.
Figure 18:
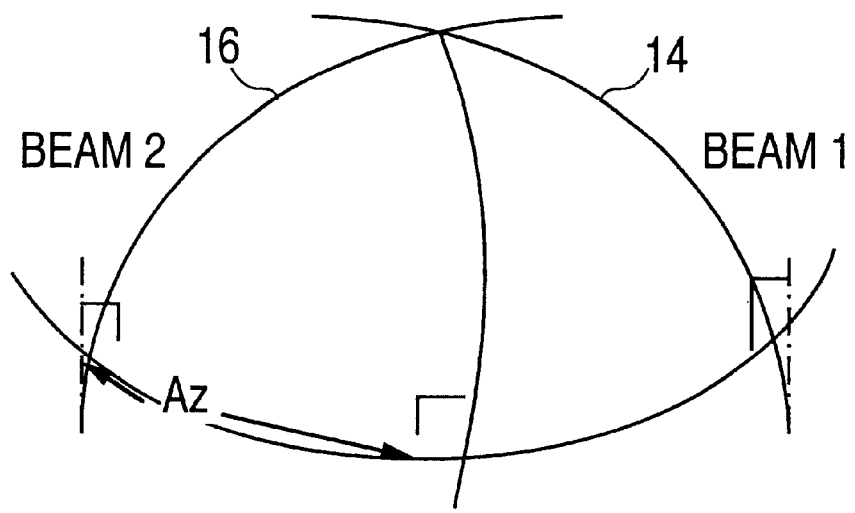
FIGS. 18–21 are spherical and triangular drawings used to illustrate the mathematical derivation of elevation and azimuth in a three-dimensional coordinate system.

In FIG. 17 there is shown a Cartesian plot of vector "r" which is useful in defining the terms elevation (el) and azimuth (az) in accordance with various aspects of applicants' position measurement system. FIG. 18 illustrates the meaning of the terms "elevation" and "azimuth" using a standard three dimensional coordinate system. The az-el pair uniquely defines only the direction of vector r and therefore only by further specifying the distance from the origin o to the point of interest r can the point r be uniquely positioned in three dimensions. Stated another way, any point along vector r has the same azimuth and elevation. As will be fully understood by those skilled in the mathematical and computational arts, with reference to FIG. 18 the quantities for elevation (el) and azimuth (az) may be mathematically defined and expressed as follows:

$$el = \tan^{-1}\left(\frac{z_r}{\sqrt{x_r^2 + y_r^2}}\right) \quad az = \tan^{-1}\left(\frac{y_r}{x_r}\right)$$

Figure 19:
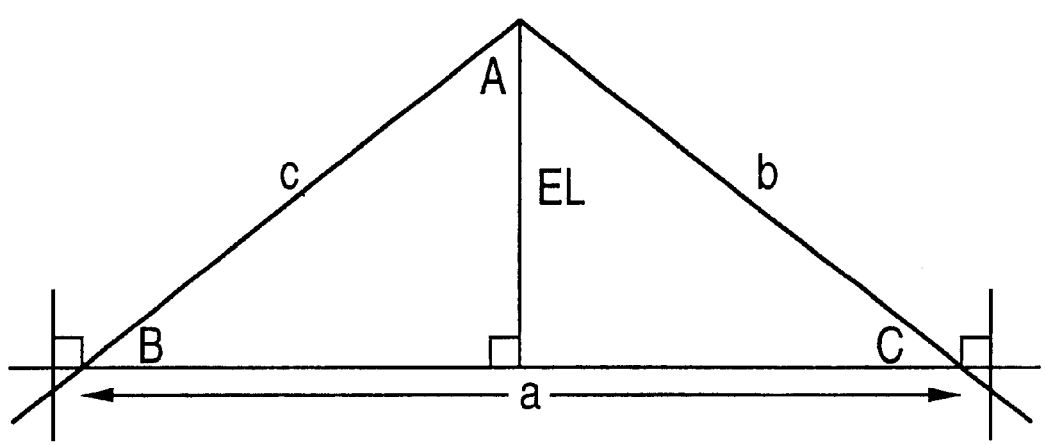

Referring now to FIGS. 18–21, there is shown a series of spatial drawings and related triangular rearrangements for ease of inspection. In general the use of spherical trigonometry to depict and thus facilitate derivation of desired mathematical relationships are useful in defining a generalized elevation/azimuth mathematical model. FIGS. 18 and 19 illustrate the fan beams 14 and 16 of optical transmitter 10 on the surface of a generalized sphere. Through the application of the well known law of cosines, the law of sines and the law of spherical triangles, a series of mathematical equations can be derived in terms of trigonometric functions for angles $\Phi_1$, $\Phi_2$ and $\Lambda_{off}$. Similarly with reference to FIGS. 20 and 21 utilizing the first fan beam 14, a mathematical expression for azimuth may be likewise derived as herein below demonstrated.

Referring to FIG. 12, the Law of Cosines tells us $$\cos A = -\cos B \cos C + \sin C \cos a. \qquad (1)$$

For a right spherical triangle, $$\sin EL = \sin B \sin c. \qquad (2)$$

From the Law of Sines, $$\frac{\sin c}{\sin C} = \frac{\sin a}{\sin A} \Rightarrow \sin c = \frac{\sin a \sin c}{\sin A} \qquad (3)$$

Substituting equation 3 into equation 2, $$\sin EL = \frac{\sin B \sin a \sin C}{\sin A} \qquad (4)$$

Using $\sin^2 A + \cos^2 A = 1$, equation 1 becomes $$\sin A = \sqrt{1 - (\cos B \cos C + \sin B \sin C \cos a)^2} \qquad (5)$$

Substituting equation 5 into equation 4, $$\sin EL = \frac{\sin B \sin a \sin C}{\sqrt{1 - (-\cos B \cos C + \sin B \sin C \cos a)^2}} \qquad (6)$$

Figure 20:
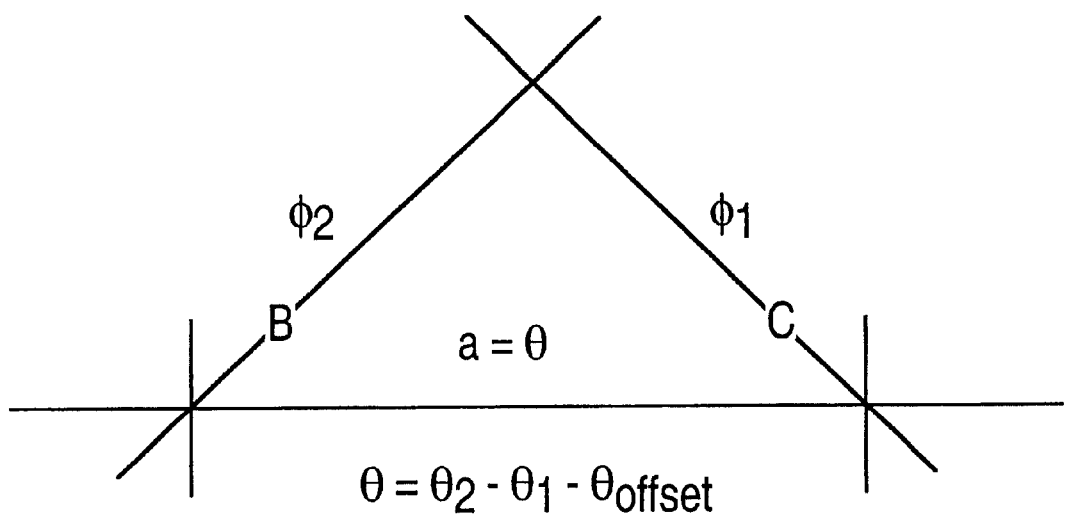
Figure 21:
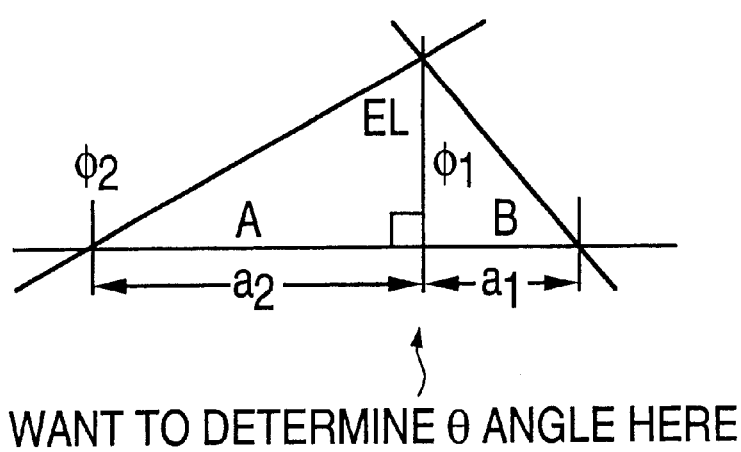

Returning to the triangle shown in FIG. 20, $$B = 90 - (-\phi_2) = 90 + \phi_2, \qquad (7)$$

$$\sin B \sin(90+\phi_2) = \cos \phi_2, \qquad (8)$$

$$\cos B = \cos(90+\phi_2) = -\sin \phi_2, \qquad (9)$$

$$C = 90 - \phi_1 \qquad (10)$$

$$\sin C = \sin(90-\phi_1) = \cos \phi_1, \text{ and} \qquad (10)$$

$$\cos C = \cos(90-\phi_1) = \sin \phi_1. \qquad (11)$$

Therefore, $$\sin EL = \frac{\cos \phi_1 \cos \phi_2 \sin \theta}{\sqrt{1 - (\sin \phi_1 \sin \phi_2 + \cos \phi_1 \cos \phi_2 \cos \theta)^2}} \qquad (13)$$

and EL is the inverse sin of the right side of the equation.

For azimuth determination, the following process is followed: From the first fan beam 14:

sin $\alpha_1$=tan EL cot B
B=90- $_1 \Rightarrow$cot(90-$\phi_1$)=tan $\phi_1$
sin $\alpha_1$=tan EL tan $\phi_1$
$Az_1 = \theta_1 \alpha_1$
$Az_1 = \theta_1 - \sin^-$(tan EL tan $\phi_1$)

From the second fan beam 16:

sin $\alpha_2$=-tan EL cot A
A=90+$\phi$2$\Rightarrow$cot(90+$\phi_2$)=-tan $\phi_2$
sin $\alpha_2$=-tan EL tan $\phi_2$
sin(-$\alpha_2$)=tan EL tan $\epsilon_2$
$Az_2 = \theta_2 + \alpha_2$
$Az_2 = \theta_2 - \sin^-$(tan EL tan $\phi_2$)

The resulting azimuth calculation is:

$$Az = \frac{Az_1 + Az_2}{2} \qquad (14)$$

In practice, the transmitter 10 must be positioned and set-up before any position information can be calculated. The desire is to position the transmitter 10 over a point of interest, for example the location of a corner of a floor or wall. First the transmitter 10 must be leveled and then it is moved in the xy plane (with z being parallel to gravity) until it is over the point of interest. In the preferred embodiment, the transmitter is self-leveling and includes an optical plummet. As previously mentioned, the optical plummet in the transmitter 10 involves a laser aligned to the spin axis of the transmitter. The laser shoots down a laser beam to the ground. To position the transmitter, the user simply moves the transmitter in the xy plane until the laser is coincident with the point of interest.

If azimuth measurements are to be made, the transmitter 10 can then be backsighted to establish a reference angle against which additional azimuth angles can be measured. The reference azimuth angle of the transmitter can be defined as the average of where the two fan beams 14, 16 are when the strobe pulse is generated. Because the strobe pulse fiires once per revolution of the rotating laser head, the two fan beams, and therefore the reference angle, should always be in the same location.

In order to measure the elevation angle of a particular point, the receiver 12 must be placed so that one of the sensors 24, or some defined point above or below them is at the point to be measured. Notably, in order to measure elevation, only one sensor 24 is needed, and the transmitter 10 need not emit a strobe pulse. The receiver 12 only needs to receive the two fan beams 14, 16 at the sensor 24. The elevation is calculated by measuring the time between the arrival of the two fan beams 14, 16 at the sensor 24. Several techniques are available for determining the elevation using the timing information and the transmitter calibration information (phi1, phi2 and Theta-offset). Assuming that the transmitter 10 is level, the elevation can either be found through table look-up or through an analytic algorithm described herein.

Since the fan beams 14, 16 have different slant angles, as described earlier, the time between their arrival at the receiver 12 will vary depending on the elevation angle of the sensor 24. In order to determine an elevation angle, therefore, the receiver 12 needs to measure the time delay between the arrival of the two fan beams. This will narrow the choice down to two angles. One of several techniques can be used to further identify which of the two angles is the real elevation angle.

The first technique is to restrict the angle between the two beams and the fan angle. As discussed, once the separation between the fans is Set (say to 90 degrees) it is then possible to adjust the slant angle and the fan angle (size of the pie) to assure that the $$Rel.\ Az. = \pi\left(\frac{\Delta d_1 + \Delta d_2}{T}\right)$$

where Rel. Az. is the relative azimuth angle of the receiver, $\Delta d_1$ is the delay until the first fan beam reaches the receiver, $\Delta d_2$ is the delay until the second fan beam reaches the receiver, and T is the period of rotation of the rotating laser head. The actual azimuth angle is then: Reference angle+ Rel. Az.

Another technique for calculating azimuth involves the taking of timing measurements by the receiver 12. A receiver 12 can make two differential timing measurement for each rotation of the transmitter 10, discussed above.

When only a single receiver 12 is used, it can be moved up or down, or closer or further from the transmitter 10, and the change in time delay can be used to determine if elevation angle is above or below the intersection elevation angle.

In order to determine azimuth, one general measurement is needed. That is the time between (i) the arrival of the strobe pulse and (ii) the average of the arrivals of the two fan beams. The average of the arrivals of the two fan beams is used so as to match the method in which the reference angle was calculated in the transmitter set-up, and because it will yield a time delay which is independent of the elevation. As explained earlier, the angular speed of the fan beams is constant, therefore the time from the strobe pulse to the average of the fan beams uniquely determines a relative azimuth angle between the receiver 12 and the reference angle.

As will be clear from the foregoing disclosure, the present improvements and inventions can be applied to a wide variety of different commercial and industrial fields, applications, industries and technologies. Some of these industrial applications include, without limitation, filmmaking, digital modeling, construction trades, power tools, surveying, construction measurement and layout, law enforcement for accident scene mapping, incident reconstruction, video games, virtual reality, manufacturing, factory automation, manufacturing measurement, etc.

While the invention has been specifically described in connection with certain specific embodiments thereof, it is to be understood that this is by way of illustration and not of limitation, and the scope of the appended claims should be construed as broadly as the prior art will permit.

What is claimed is:

1. An improved receiver for use in a robotic theodolite spatial positioning apparatus, comprising:
    a receiver having a sensor that receives a first position signal and a second position signal and outputs a first and a second receive signal, the first and second position signal originating from a single location;
    a calculator that determines a first separation time interval between the first and second receive signals, converts the first time separation interval into elevation angle data and outputs the elevation angle data, and
    a display that receives and displays the elevation angle data output.

2. The positioning apparatus of claim 1, wherein the first position signal and the second position signal originate from a single transmitter.

3. The positioning apparatus of claim 1, wherein the first and second position signals comprises one of a laser beam, a radio frequency signal beam and an infrared signal beam.

4. The positioning apparatus of claim 2, said calculator further comprising a database containing transmitter calibration data.

5. The positioning apparatus of claim 4, wherein said transmitter calibration data is used to convert the first separation time interval into the elevation angle.

6. The positioning apparatus of claim 1, wherein the sensor receives a third position signal and outputs a third receive signal,
    wherein the calculator receives the third receive signal and determines a third receive signal arrival time and converts the first separation time interval and the third receive signal arrival time into an azimuth angle data and outputs the azimuth angle data, said display receiving the azimuth angle data output and displays the azimuth angle.

7. The positioning apparatus of claim 6, wherein the third position signal is a strobe pulse.

8. The positioning apparatus of claim 1, wherein the sensor is a broadband detector.

9. The positioning apparatus of claim 8, wherein the broadband detector is a photodetector.

10. The positioning apparatus of claim 9, wherein the photodetector is a silicon photodetector.

11. The positioning apparatus of claim 1, further comprising a user interface that allows a user to interact with the receiver.

12. The positioning apparatus of claim 11, wherein the user interface is one of a keyboard, a pointing device, a joystick, a rocker device, a tactile interface, a touch screen, a thumbwheel and an audio receiver.

13. The positioning apparatus of claim 11, further comprising a menu-driven operating system that displays a user-selectable menu on the display and allows a user to select calculator functions according to user interaction with the user interface.

14. The positioning apparatus of claim 1, wherein the display is one of a cathode ray tube, a liquid crystal display, a printer, and a projector and screen.

15. The positioning apparatus of claim 1, wherein the calculator is at least one of a program stored in a memory, a general purpose computer, a special purpose computer, programmed microprocessor, or microprocessor, and application specific integrated circuit, a programmable logic device, a digital signal processor, and a hard wired electronic or logic circuit.

16. The positioning apparatus of claim 1, further comprising a clock that receives the first and a second receive signal and outputs said first receive signal comprising a first receive signal time stamp and said second receive signal comprising a second receive signal time stamp, said calculator receives the first receive signal time stamp and second receive signal time stamp to determine the first separation time interval.

17. The positioning apparatus of claim 1, the calculator further comprising a directional determination portion that determines which direction the receiver must be moved in order to arrive at a predetermined location and outputs directional information, whereby the display receives and displays the directional information.

18. The positioning apparatus of claim 1, further comprising an input/output interface connectable to an external apparatus.

19. The positioning apparatus of claim 18, wherein the external apparatus contains a memory.

20. The positioning apparatus of claim 18, wherein the input/output interface is at least one of a communications interface, a network card, a dial-up modem, a parallel port, a serial port, a universal serial bus port and an infrared port.

21. The positioning apparatus of claim 1, wherein the apparatus is a hand-held device.

22. An improved receiver for use in a robotic theodolite spatial positioning apparatus, comprising:
a hand-held receiver;
a sensor that receiver first and second position signals and outputs a first and second receive signal;
a clock that receives the first and second receive signals and outputs a first receive signal time stamp and a second receive signal time stamp;
a memory that stores calibration information;
a calculator that receives the first and second receive signals and the first and second receive signal time stamps, determines a first separation time interval between the first position signal and the second position signal, converts the first separation time interval into an elevation angle and outputs the elevation angle, and
a display that receives the elevation angle and displays the elevation angle.

23. A method for determining a relative position of a receiver with respect to a single transmitter by sensing position signals and determining the time interval between the signals, comprising the steps of:
receiving a first position signal from the transmitter;
time-tagging the first position signal and outputting a first receive signal;
receiving a second position signal from the transmitter;
time-tagging the second position signal and outputting a second receive signal;
retrieving transmitter calibration data from memory;
determining the elevation of the receiver;
outputting the receiver elevation to a display; and
displaying the receiver elevation of the receiver.

24. The method of claim 23, further comprising the step of
inputting into the receiver a desired elevation;
comparing the desired elevation with the receiver elevation;
determining which direction to move the receiver towards the desired elevation; and
displaying the direction to move the receiver towards the desired elevation.

25. The method of claim 23, further comprising the step of emitting an audio signal that varies with the proximity of the receiver to the desired elevation.

26. The method of claim 23, further comprising the steps of:
receiving a third position signal;
time-tagging the third position signal and outputting a third receive signal;
determining the azimuth of the receiver;
outputting the receiver azimuth to a display; and
displaying the azimuth of the receiver.

27. A method for determining an azimuth and an elevation of a receiver with respect to a single transmitter by sensing position signals and determining the time interval between the signals, comprising the steps of;
receiving a first position signal from the transmitter;
time-tagging the first position signal and outputting a first receive signal;
receiving a second position signal from the transmitter;
time-tagging the second position signal and outputting a second receive signal;
retrieving transmitter calibration from memory;
determining the elevation of the receiver;
outputting the receiver elevation to a display;
displaying the receiver elevation of the receiver;
receiving a third position signal;
time-tagging the third position signal and outputting a third receive signal;
determining the azimuth of the receiver;
outputting the receiver azimuth to a display; and
displaying the azimuth of the receiver.

* * * * *